Oct. 18, 1949.　　　B. OLNEY ET AL　　　2,485,405
DIPOLE MICROPHONE
Filed April 21, 1944　　　6 Sheets-Sheet 2
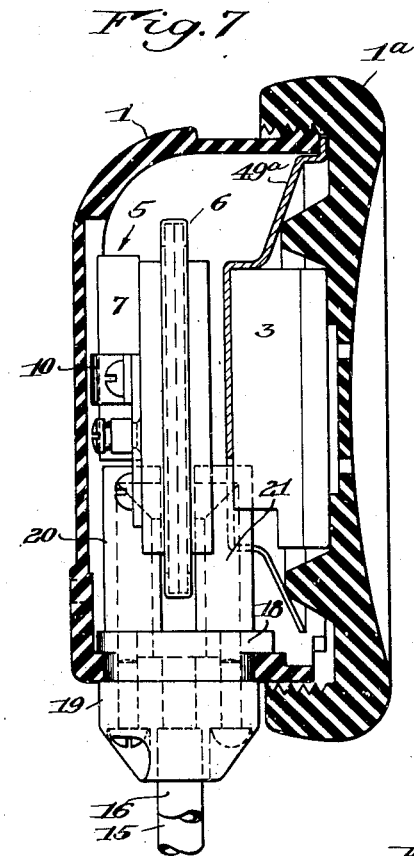
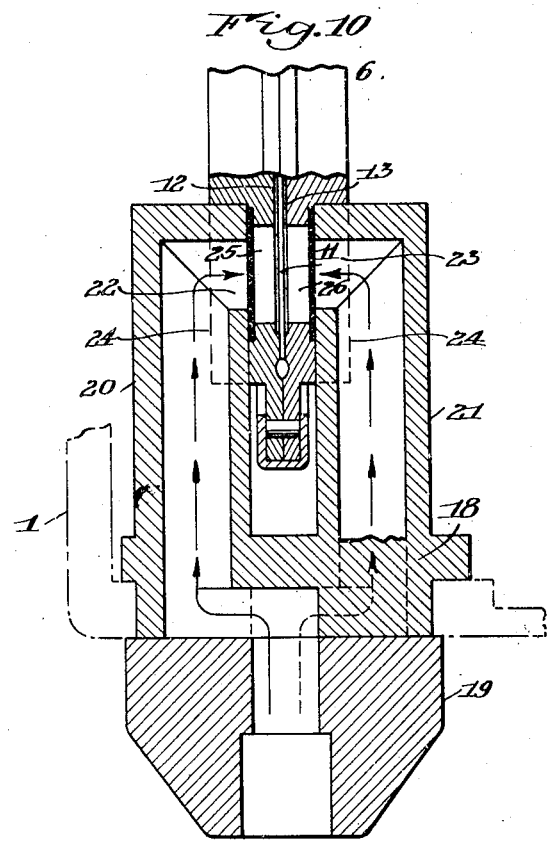
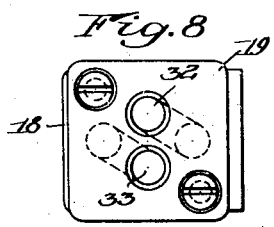
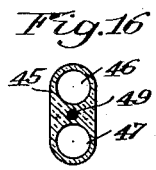
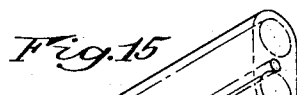
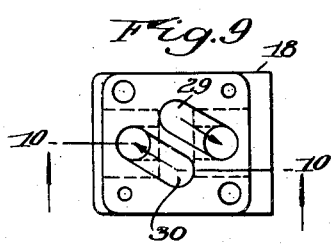
INVENTORS
B. Olney
F. H. Slaymaker
BY W. F. Meeker
D. Clyde Jones
their Attorney Oct. 18, 1949.  B. OLNEY ET AL  2,485,405
DIPOLE MICROPHONE
Filed April 21, 1944  6 Sheets-Sheet 3

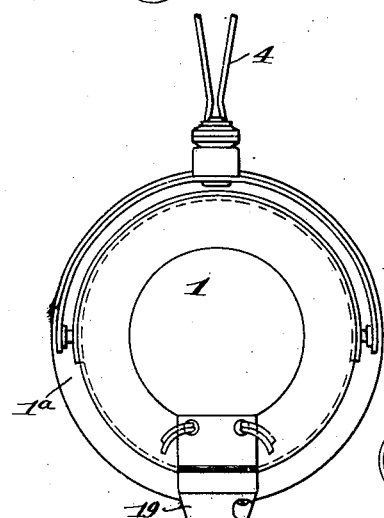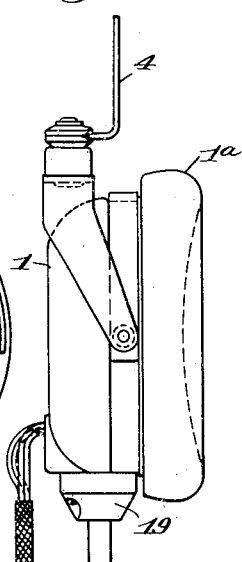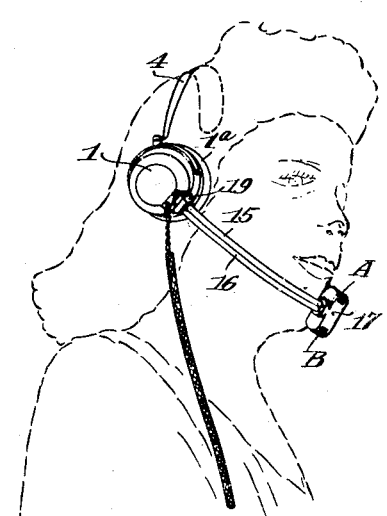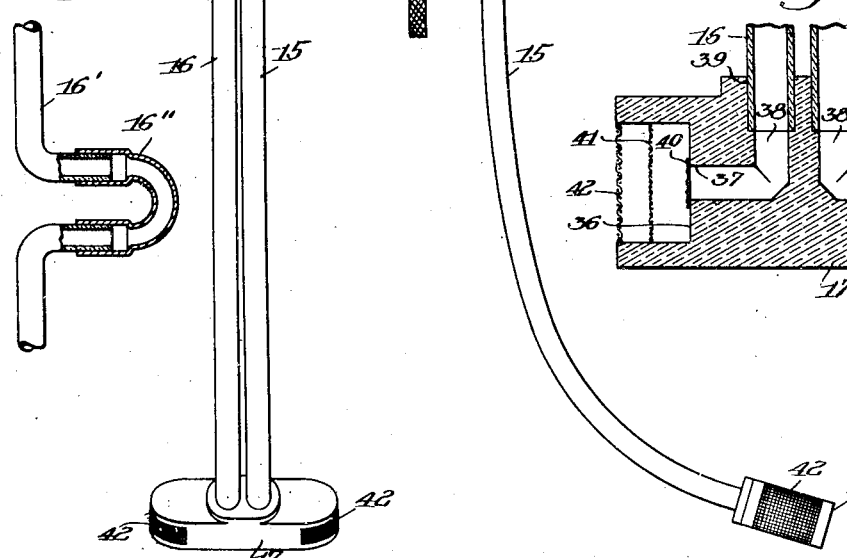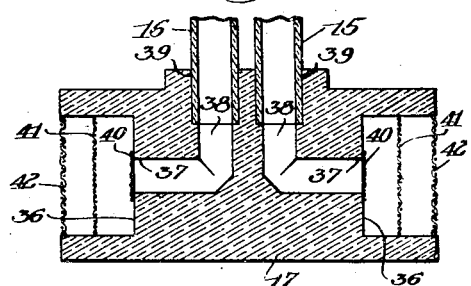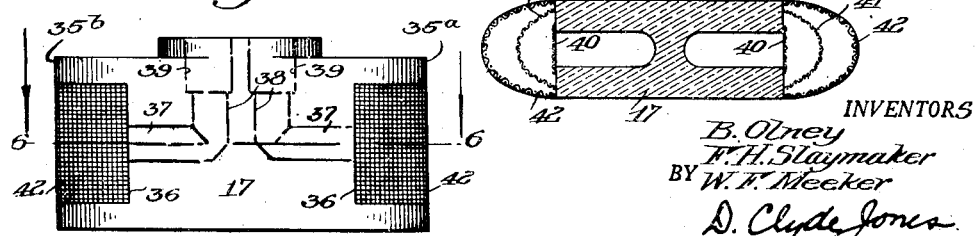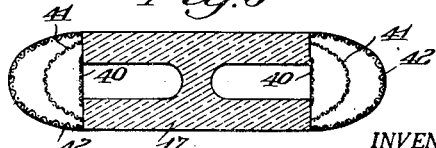

INVENTORS
B. Olney
F. H. Slaymaker
BY W. F. Meeker

D. Clyde Jones
Their Attorney

Oct. 18, 1949.    B. OLNEY ET AL    2,485,405
DIPOLE MICROPHONE
Filed April 21, 1944    6 Sheets-Sheet 4

INVENTORS
B. Olney
F. H. Slaymaker
BY W. F. Meeker
D. Clyde Jones
their ATTORNEY Oct. 18, 1949.　　B. OLNEY ET AL　　2,485,405
DIPOLE MICROPHONE
Filed April 21, 1944　　6 Sheets-Sheet 5

INVENTORS
B. Olney
F. H. Slaymaker
BY W. F. Meeker
D. Clyde Jones
their ATTORNEY Oct. 18, 1949.  B. OLNEY ET AL  2,485,405
DIPOLE MICROPHONE
Filed April 21, 1944  6 Sheets-Sheet 6

INVENTORS
B. Olney
F. H. Slaymaker
BY W. F. Meeker
D. Clyde Jones
their ATTORNEY

Patented Oct. 18, 1949

2,485,405

UNITED STATES PATENT OFFICE 2,485,405

DIPOLE MICROPHONE

Benjamin Olney, Frank H. Slaymaker, and Willard F. Meeker, Rochester, N. Y., assignors to Stromberg-Carlson Company, Rochester, N. Y., a corporation of New York Application April 21, 1944, Serial No. 532,168

17 Claims. (Cl. 179—102)

This invention relates to electro-acoustical transducers and especially to microphones and to similar sound pickup devices.

In telephone transmitters, acoustical wattmeters, acoustical impedance meters and similar devices, there is involved the problem of picking up energy from sound waves and conveying or applying it to a unit which translates it into corresponding electrical effects.

In the case of telephone transmitters, it is frequently desirable that these devices discriminate against unwanted sounds. For example, in a telephone exchange, the noise at neighboring operators' positions should not be picked up by a given operator's transmitter. It would be an advantage if the transmitter were small so that it could be supported with the receiver against the operator's ear, thereby obviating the need for the usual chest-supported, horn-type microphone.

In an acoustical wattmeter or impedance meter, a suitable microphone unit or pickup device is essential in order to measure the energy being carried by sound waves. To determine sound intensity in a free field, it is merely necessary to measure the sound pressure, but in the presence of reflected waves, the relation of the pressure and particle velocity components of the waves may be disturbed so that the pressure alone is no longer a reliable indication of the sound intensity. Under such conditions, the sound intensity can be determined only if the pressure and velocity components of the wave, as well as the phase angle between them, are taken into account. However, relatively large microphone units or pickups cause difficulties at high frequencies since the microphone size and spacing is comparable to the wave length. However, the tube type or probe microphone construction of the present invention permits the pickup units to be made small enough so that they disturb the wave very little. Also, the tube units can be mounted close together so that the sound energy can be derived from a very small region.

The various features and advantages of the invention will appear from the detailed description and claims when taken with the drawings in which:

Fig. 1 is a perspective view of one embodiment of the invention wherein there is provided a combined receiver and dipole microphone adapted to be worn as shown;

Fig. 2 is a side view and Fig. 3 is a rear view of the telephone combination illustrated in Fig. 1;

Fig. 4 is a plan view of a mouthpiece suitable for use in this embodiment;

Fig. 5 is a vertical section through this mouthpiece;

Fig. 6 is a sectional view thereof, taken on the line 6, 6 of Fig. 4;

Fig. 7 illustrates that portion of the microphone and the receiver which is mounted within the casing or shell, the shell being broken away to illustrate the arrangement of the parts therein;

Fig. 8 is a bottom view of the junction block assembled on the bottom of the yoke;

Fig. 9 is a bottom view of the yoke alone;

Fig. 10 is a section taken substantially on the line 10, 10 of Fig. 9 showing the relation of the passages through the junction block and through the passages in the yoke as well as the respective cavities at each surface of the diaphragm mounted within the capsule;

Fig. 15 is a perspective view and Fig. 16 is a cross section through a modified form of tubing for connecting the mouthpiece with the microphone unit;

Fig. 17 illustrates a construction whereby the effective length of a tube connecting the mouthpiece to the microphone unit, can be adjusted;

Figure 27:
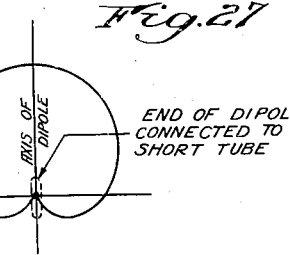
Figure 28:
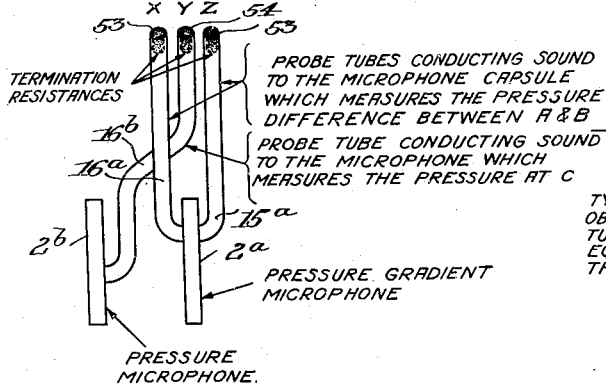
Figure 29:
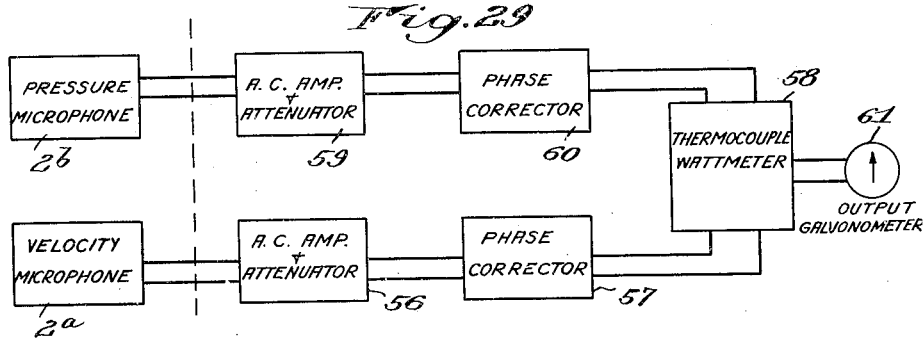
Figure 30:
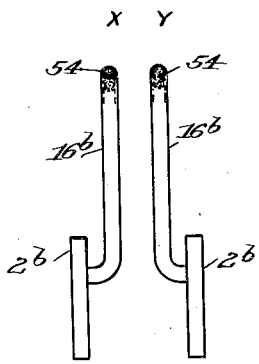
Figure 31:
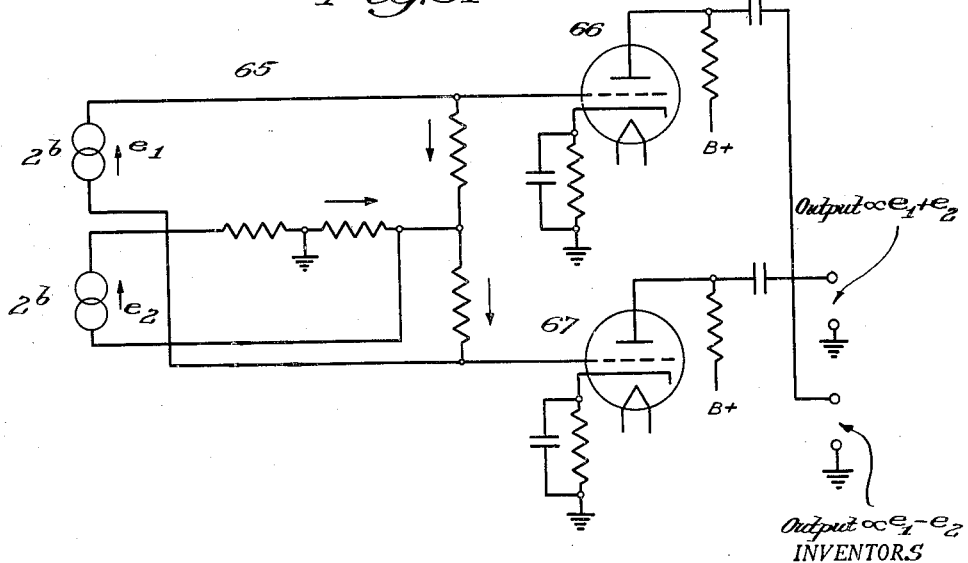

Figs. 22 to 26 inclusive are diagrams useful in explaining the principles of the invention;

Fig. 27 is a diagram useful in explaining the directional characteristics of the present dipole invention when tubes of different lengths are incorporated therein;

Fig. 28 is a diagrammatic showing of one type of microphone unit made in accordance with the present invention and suitable for use in an acoustical wattmeter or impedance meter;

Fig. 29 is a block diagram of an acoustical wattmeter or impedance meter incorporating the microphone or transducer unit of Fig. 28;

Fig. 30 is a diagrammatic showing of another type of microphone pickup of the present invention, likewise suitable for use in an acoustical wattmeter or impedance meter;

Fig. 31 is a circuit network which will be substituted for that portion of the meter of Fig. 29 at the left of the broken line thereof when the microphone pickup of Fig. 30 is used.

Figure 11:
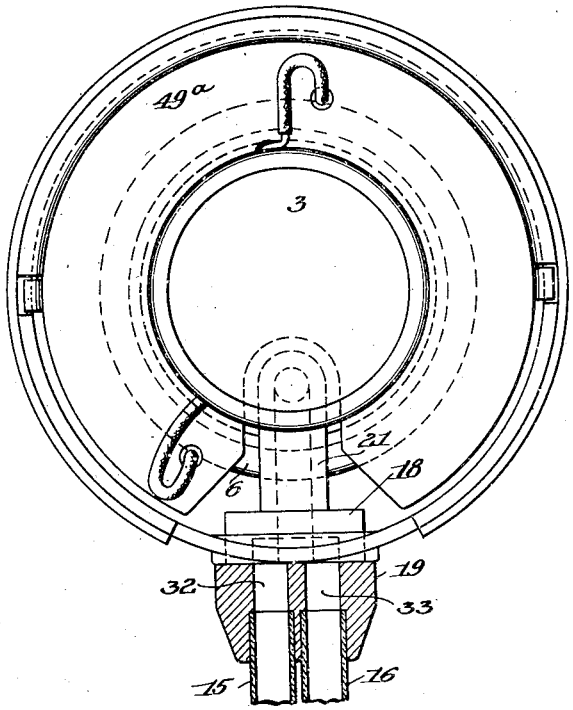
Fig. 11 is an enlarged view of the elements mounted within the shell, particularly illustrating the microphone element and the receiver with the shield mounted between these parts and providing a support for the receiver.
Figure 12:
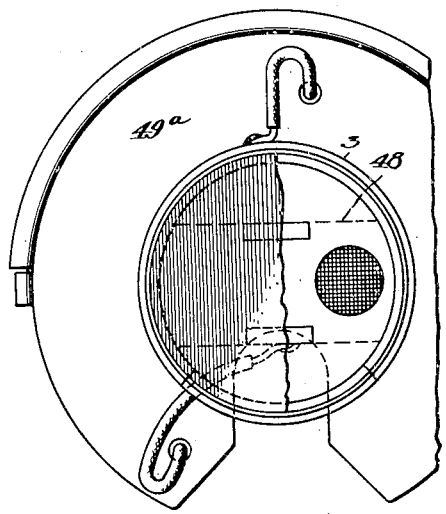
Fig. 12 is a front view of a portion of the shield alone with the receiver mounted thereon.
Figure 13:
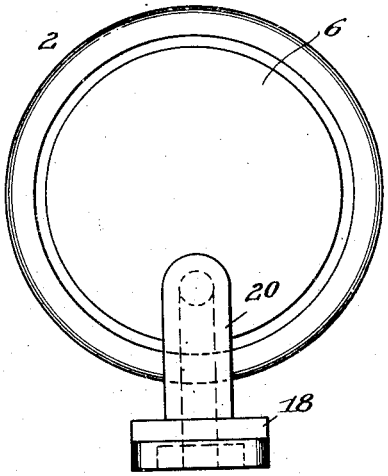
Fig. 13 is a face view of the microphone unit with the yoke mounted thereon.
Figure 14:
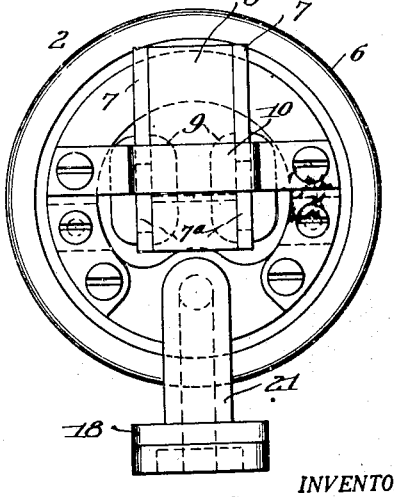
Fig. 14 is a similar view of the reverse side of the microphone and yoke.

One embodiment of the invention, in the form of a dipole microphone of the pressure gradient type, is shown incorporated in an operator's telephone set in Figs. 1 to 17 inclusive. This telephone set comprises a shell 1 in which a microphone unit generally designated 2 and a telephone receiver 3 are enclosed, the shell with its enclosed parts being of a size and weight to be supported against the ear of the operator by means of a band 4 engaging the operator's head. The microphone unit may be any type of electro-acoustic transducer including a carbon or piezoelectric system. As herein illustrated, the microphone unit 2, preferably of the electromagnetic type, comprises an electromagnetic element 5 and the microphone capsule 6 of aluminum alloy on which this element is mounted. This electromagnetic element includes a pair of spaced pole pieces 7, 7 secured to the respective sides of a rectangular permanent magnet 8, these parts being retained in the position illustrated in Fig. 14 by a suitable brass clamp 10 secured to the capsule. Each pole piece has a part encircled by a coil 9, the two coils 9 being electrically connected in series for inclusion in a transmitter circuit (not shown). The extensions 7a, 7a (Fig. 14) of the two pole pieces just project through a wall of the capsule being sealed therein against air leakage. Thus, the extensions 7a, 7a of the pole pieces are positioned close to one surface of a diaphragm 11 within the capsule so that the electromagnetic element is influenced by the action of the diaphragm. Although this diaphragm is shown to be clamped in Fig. 10, it can be unclamped. The diaphragm defines the cavities 12 and 13 at the respective sides thereof, which cavities are proportioned to give adequate damping of the diaphragm resonance peak and to prevent a nodal diameter mode of vibration as will be further discussed hereinafter. The cavities 12 and 13 communicate through the tubes 15 and 16 respectively, which terminate in the mouthpiece 17 to be held adjacent the operator's mouth so that the usual horn type microphone can be dispensed with. While the optimum internal diameters of the tubes 15 and 16 are related to the characteristics of diaphragm, in one model they measured nine-sixty fourths of an inch. The specific construction which affords communication between the cavity 12 and tube 15 on the one hand and between cavity 13 and tube 16 on the other, is shown in Figs. 7 to 10 inclusive and comprises a yoke 18 together with a connection block 19. The yoke (Fig. 10) is made with two hollow branches 20 and 21 respectively provided with openings 22 and 23 in their respective inner surfaces. The faces of the microphone capsule are milled out to provide recesses 24 having openings 25 and 26 into the cavities 12 and 13, the mentioned openings being preferably covered by dirt screens. Thus, the recesses in the microphone capsule can snugly receive the branches of the yoke with the openings 22 and 23 of the yoke respectively communicating with the openings 25 and 26 through the face walls of the capsule. The lower end of the yoke is provided with diagonally extending recesses 29 and 30 which communicate respectively with the hollow passages through the yoke branches. The connection block which can be assembled on the mentioned lower end of the yoke by suitable screws, has a pair of passages 32 and 33 extending therethrough to open into the recesses 29 and 30 respectively. By this construction, the pair of passages through the block which are arranged in one plane can communicate with the pair of yoke passages which are arranged in a plane extending at right angles to the first plane. The lower ends of these passages 32 and 33 are slightly enlarged to frictionally receive the upper ends of the tubes 15 and 16.

The dipole mouthpiece 17, as best shown in Figs. 4, 5 and 6 is preferably made of a block of light weight molded material having its ends 35a and 35b rounded, as illustrated. Each of the rounded ends of the mouthpiece is notched as at 36 and has an opening 37 in the notched part communicating with a passageway 38. Each passageway 38 is formed with a bend leading to an orifice 39 in one side of the block. It will be noted that the two orifices 39, 39 are located close together and may detachably receive the free ends of the tubes 15 and 16.

Each opening 37 from the passageway into the notched part of the mouthpiece is covered by a disc 40 of silk fabric secured at its margin by suitable adhesive to the surface of the mouthpiece. The weave of the silk should be such as to provide the proper acoustic terminal impedance for the tubes 15 and 16, the purpose of which will be hereinafter set forth. Each notched end of the mouthpiece carries two curved pieces 41 and 42 of screening, such as wire gauze, the outer screen 42 conforming generally to its related rounded end of the mouthpiece. As illustrated in Fig. 1, the dipole mouthpiece is worn close to the lips, although this position is not critical, and consequently, in the absence of these screens 41 and 42, there would be serious blasting noises in the microphone due to the puffs of air accompanying such sounds as "p" and "t." This double puff screen construction provides more effective reduction of puffing than a single screen and in addition enables the operator to remove and sterilize the outside screens without exposing the terminal resistances 40 to mechanical damage. Since the mouthpiece is intended to be worn with one end of the dipole relatively close to the lips and the other dipole end directed toward the chin, the tubes 15 and 16 are preferably made of some shape-retaining deformable material which may be, for example, a thermo-plastic material, such as that now known as "Saran," so that the tubes can be generally shaped to the contour of the operator's face whereby the mouthpiece will be properly located with respect to the operator's mouth when the telephone receiver is supported in contact with one of her ears, as shown.

Instead of using two separate tubes, such as 15 and 16, a single strip of relatively soft material 45 (Figs. 15 and 16) having two passages 46 and 47 therethrough may be used, when the openings in the yoke and in the mouthpiece are modified to receive the respective ends of the strip. In this modification, the strip has a wire 49 incorporated therein which tends to cause the strip to remain in the position to which it has been bent in the course of being adjusted to the head of an operator.

Under certain conditions it may be desirable to modify the directional characteristics of the microphone and for this purpose at least one of the tubes 15 and 16 may be arranged so that its effective length can be adjusted at will. For example, the tube 16' (Fig. 17) is provided with a telescoping crook 16'' similar to a tuning slide on a trumpet.

The telephone receiver 3 may be any light weight watch case receiver of small size. One flat side of the receiver is provided with an opening to allow room for the yoke 18 to be assembled on the capsule 6 when the microphone 2 and the receiver 3 are compactly arranged as shown with the microphone magnet 8 at right angles to the receiver magnet 48 and its related pole pieces. A magnetic shield 49a is mounted between the microphone and the receiver to prevent disturbing action therebetween. This shield also serves as a mechanical support for holding the receiver against the ear cap 1a of the shell.

Figure 18:
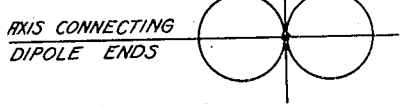
Fig. 18 is a diagram illustrating the field of response of one embodiment of the pick-up unit of this invention.
Figure 22:
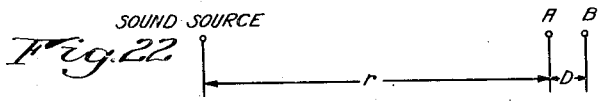

A dipole microphone may be defined as one whose sound pickup elements are arranged in the form of an acoustic dipole, and are differentially associated with the transducer element. Such a microphone responds to a sound wave, only if there is a difference in pressure between the dipole ends 35a and 35b (Fig. 4). A sound originating in the plane midway between A and B, for example, would produce no pressure difference and, hence, no microphone response. The directional characteristics of the dipole microphone are shown in Fig. 18. When the microphone is worn as shown in Fig. 1, the plane of minimum response includes sounds originating at each side of the operator, and also sounds coming from in front of and somewhat below the operator's head. Thus the microphone can be oriented so as to discriminate against the voices of the adjacent operators and the clattering of plugs on the switchboard, and yet be in a position to give maximum response to the voice of the wearer.

Even in the direction of its maximum response, the dipole microphone discriminates against distant sounds—especially sounds of low frequency. This is of benefit in many locations where rumbling noises are troublesome. The explanation is as follows: when the microphone is worn with one end of the dipole close to the lips, sounds issuing from the wearer's mouth give rise to amplitude, as well as phase differences at the dipole ends. For sounds arriving from a distance, however, there is substantially no amplitude difference at the dipole ends. Consequently, the response in this latter case is due almost entirely to phase difference. As the wave length of the received sound becomes longer, the distance between the dipole ends constitutes a smaller and smaller proportion of the wave length. Thus, the phase difference becomes progressively smaller for lower frequencies. It is this fact which accounts for the discrimination mentioned above.

A further substantial gain in signal-to-room-noise ratio over the conventional breastplate transmitter is obtained because of the close location of the dipole to the lips. This location is fixed, whereas the corresponding relation in the case of the breastplate transmitter varies as to angle and distance with the movements of the wearer's head.

A still further advantage of the dipole microphone in noisy locations is its freedom from resonant peaks, as compared with strong resonances of the usual breastplate transmitter horn. These latter resonances are shock-excited by certain of the noise components, and the noise is effectively amplified in the process.

Figure 19:
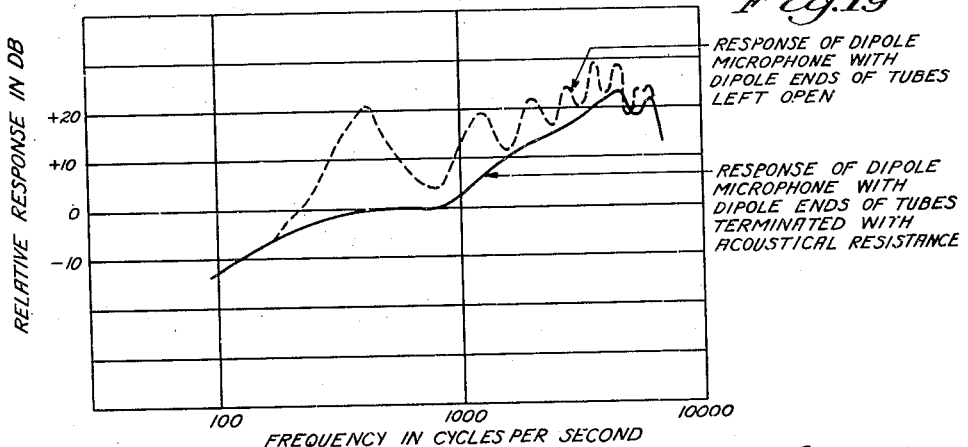
Fig. 19 illustrates, by the broken line, the response of a dipole microphone with the dipole ends of the tubes left open while the full line graph illustrates the response of the dipole microphone of the present invention when the dipole ends of the tubes are terminated with acoustical resistances.
Figure 20:
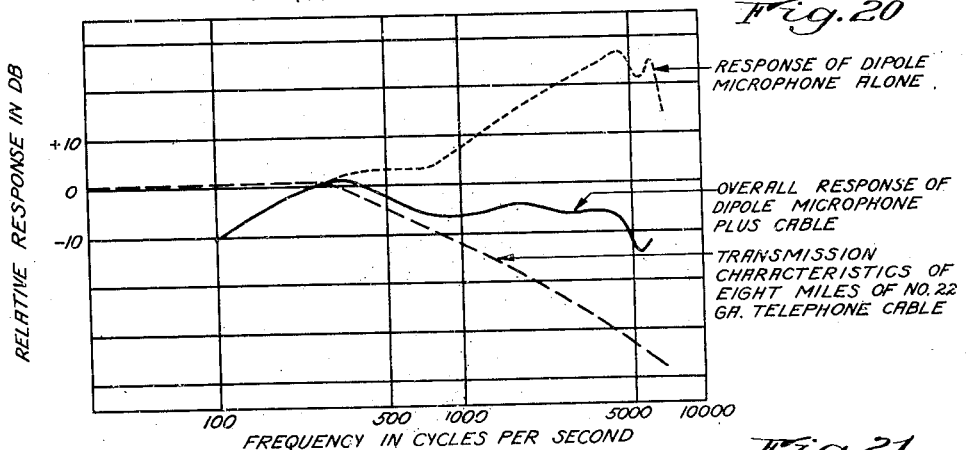
Fig. 20 is a chart illustrating by the dotted line, the response of the present dipole microphone alone, and the broken line curve represents the transmission characteristic of eight miles of #22 telephone cable, while representing by the full line curve, the overall response of the present dipole microphone plus the mentioned cable.
Figure 21:
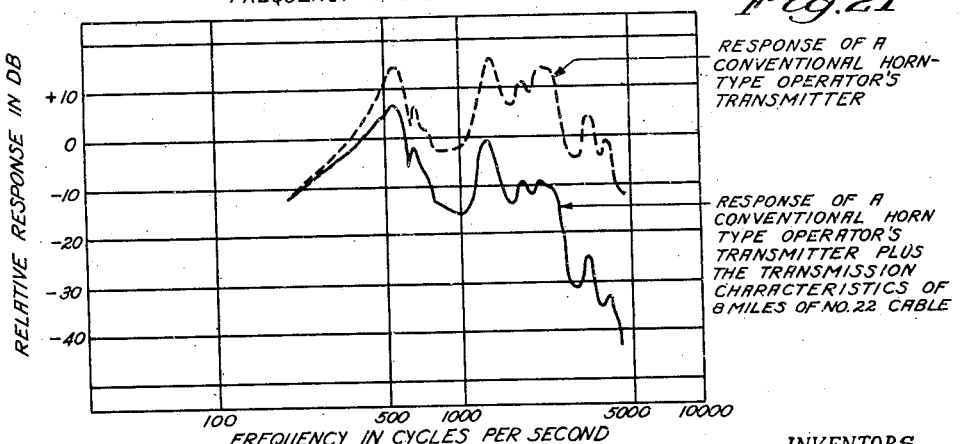
Fig. 21 illustrates, by the broken line curve, the response of a conventional horn type operator's transmitter, while by the full line, it illustrates the response of the mentioned horn type transmitter plus the transmission characteristics of eight miles of #22 cable.

The use of tubes, such as 15 and 16, constitute an acoustic transmission line for the conduction of sound from the dipole mouthpiece to the microphone unit proper (located in the receiver case), makes it possible to eliminate the large horn traditionally associated with operator's sets. The inherent presence of standing waves in tubes 15 and 16 has, in the past, prevented the use of a microphone employing a small number of tubes where reasonably faithful reproduction was desired. In the present dipole microphone, however, a termination resistance 40 at the dipole end of each tube matches the acoustic impedance of the tube and eliminates the effect of the standing waves. Fig. 19 shows (solid line curve) the normal frequency response of this microphone and, for purposes of comparison, the response (dotted line curve) with the terminating resistance removed. It will be noted that the normal response of the microphone rises 6 db per octave toward the high frequencies. This type of response compensates for the drooping transmission characteristic of unloaded cable circuits. Fig. 20 shows the transmission characteristic of eight miles of No. 22 cable and the overall response of the cable and microphone. For comparison, Fig. 21 shows the response of the conventional horn type operator's set.

*Fundamental theory*

The principles of the invention will best be understood by reference to Figs. 17 to 22 together with the following analysis. The pressure at a distance $r$ from a point source of sound can be expressed by $$p = \frac{A\omega\rho}{r} \sin k(ct-r) \qquad (1)$$

where:
$p$ = the sound pressure at the point in questions.
$A$ = the amplitude of the velocity potential.
$\rho$ = the density of the medium.
$r$ = the distance from the point source to the point in question.
$\omega = 2\pi f$, where $f$ is the frequency.
$c$ = velocity of sound in the medium.
$t$ = time.
$k = 2\pi/\lambda$, where $\lambda$ = the wave length of the sound wave.

The difference in pressure between two points A and B separated by a distance D (Fig. 22) is given by the following expression:

$$\Delta p = A\omega\rho\left[\frac{\sin k(ct-r)}{r} - \frac{\sin k(ct-r-D)}{r+D}\right] \quad (2)$$

Two extreme conditions are of interest in practice. One is for sounds originating at a distance from the microphone; i. e., $r$ is large compared to $D$. The other is for sounds originating very close to the microphone; i. e., $r$ is small compared to $D$. Also, in general, $D$ is small compared to the wave length, and $kD$ is small compared to unity. If $r$ is large and $kD$ is small, Equation 2 becomes $$\Delta p \doteq kD\frac{A\omega\rho}{r}\cos k\left(ct-r-\frac{D}{2}\right) \quad (3)$$

Equation 3 shows that for a sound arriving from a distance, $|\Delta p|$ is smaller than the pressure at A by a factor $kD$. If $r$ is small compared to $D$, Equation 2 becomes $$\Delta p \doteq \frac{A\omega\rho}{r}\sin k(ct-r) \quad (4)$$

A comparison between Equation 1 and Equation 4 shows that $\Delta p$ is approximately the same as the pressure at point A. If, however, the sound source is located on the median plane between points A and B, there is no resultant difference in pressure between the two points.

*A pressure gradient microphone close to the source*

When a pressure gradient micrphone is used close to the source, it becomes an instrument which discriminates very powerfully against sounds arriving from a distance ("a distance" being merely a few feet for voice frequencies). The factors responsible for this discrimination can be summarized as follows:

1. For sound arriving from a distance, the pressure gradient (strictly a pressure increment) is smaller than the sound pressure by a factor $kD$—a reduction which is especially apparent at low frequencies.

2. Sound which appears to originate in a plane midway between points A and B (see Fig. 1 and Fig. 22) produces no difference in pressure between the points and no response in the microphone.

3. A sound close to the microphone will, inherently, produce a greater response than a sound which is far away.

*Analysis and factors affecting the frequency response of the dipole microphone*

Figure 23:
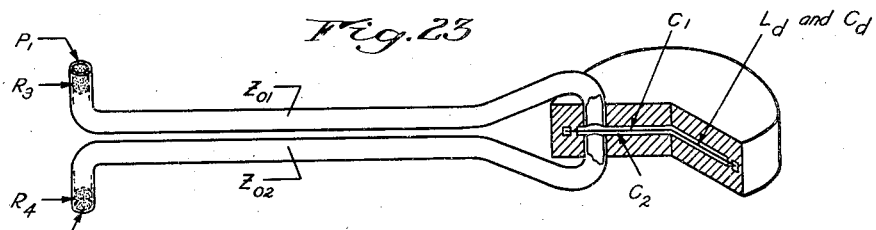
Figure 24:
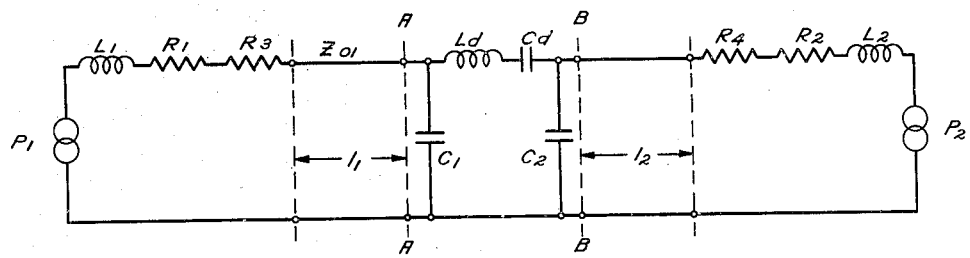
Figure 25:
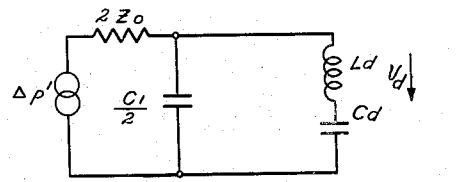

The factors affecting the response of a dipole microphone will best be understood by reference to Figs. 23, 24 and 25. Fig. 23 is a diagrammatic representation of the acoustic elements and the diaphragm of a dipole microphone. Fig. 24 shows the analogous electrical circuit corresponding to Fig. 23; and Fig. 25 is a simplification of Fig. 24. A list of symbols pertaining to the above three figures is given below:

$p_1$=sound pressure at one end of the dipole.
$p_2$=sound pressure at the other end of the dipole.
$L_1$=acoustic inertance due to radiation from the end of one tube.
$L_2$=acoustic inertance due to radiation from the end of the other tube.
$R_1$=acoustic resistance due to radiation from the end of one tube.
$R_2$=acoustic resistance due to radiation from the end of the other tube.
$R_3$=acoustic resistance inserted to terminate one tube
$R_4$=acoustic resistance inserted to terminate the other tube.
$Z_{01}$=characteristic acoustic impedance of the first tube=$\rho c/s_1$.

Where:

$\rho$=density of the medium.
$c$=velocity of sound in the medium.
$s_1$=cross-sectional area of the first tube.
$Z_{02}$=characteristic acoustic impedance of the second tube=$\rho c/s_2$.

Where:

$s_2$=the cross-sectional area of the second tube.
$C_1$=acoustic compliance of the cavity on the first side of the diaphragm.
$C_2$=acoustic compliance of the cavity on the other side of the diaphragm.
$L_d$=mass of the diaphragm (in consistent units).
$C_d$=compliance of the diaphragm (in consistent units).
$v_d$=diaphragm velocity (in consistent units).
$l_1$=length of the first tube.
$l_2$=length of the second tube.

Any type of transducer may be used to convert the diaphragm motion into electrical energy, but for the purposes of analysis it will be assumed that the transducer is some sort of an electromagnetic element which generates an E. M. F. proportional to the diaphragm velocity ($v_d$). Although it would be possible to derive a general expression for $v_d$ in terms of $p_1$ and $p_2$ and all the circuit constants, the inherent symmetry of the microphone and the relative magnitudes of the end effects compared to the characteristic impedance of the respective tubes make possible considerable simplification. In practice, $C_1=C_2$, $l_1=l_2$, $Z_{01}=Z_{02}=R_3=R_4$, $R_1=R_2$, and $L_1=L_2$. Also $|R_1+j\omega L_1| \ll Z_{01}$, so $R_1$ and $L_1$ can be neglected. It follows, then, that looking back toward the generator from either AA or BB, the tube being considered is, in effect, a transmission line excited from a source having an internal impedance equal to the characteristic impedance of the tube. The impedance looking back from AA or BB is also equal to the characteristic impedance of the tube. From Thevenin's theorem and Kirchhoff's laws it can be shown that the circuit of Fig. 25, insofar as $v_d$ is concerned, is the equivalent of the circuit in Fig. 24.

$\Delta p'$ in Fig. 25 is the difference in the "open circuit pressures" at AA and BB in Fig. 8. $Z_0$ is used instead of either $Z_{01}$ or $Z_{02}$ since the two are equal. If losses in the transmission tubes are neglected, it can be shown, from transmission line theory, that $$\Delta p' = \frac{-j\Delta p}{\sin kl_1 - j\cos kl_1} \quad (5)$$

where $\Delta p$ is the difference in pressure between $p_1$ and $p_2$. It will be noted that $$|\Delta p| = |\Delta p'|$$

and the only effect of the tubes is to introduce a phase shift. If the ends of the tubes had been left open and $R_3$ and $R_4$ eliminated the tube impedance viewed from AA or BB would be either inductively or capacitatively reactive, and $\Delta p'$ would show sharp resonance peaks.

From Fig. 25 and Kirchhoff's laws:

$$v_d = \frac{\Delta p \frac{1}{j\omega C_1}}{\left(j\omega L_d + \frac{1}{j\omega C_d}\right)\left(Z_0 + \frac{1}{j\omega C_1}\right) + \frac{2Z_0}{j\omega C_1}} \cdot \frac{-j}{\sin k l_1 - j \cos k l_1} \quad (6)$$

For low frequencies such that $$\frac{1}{j\omega C_1} \gg Z_0 \text{ and } \frac{1}{j\omega C_d} \gg Z_0$$

$$|v_d| \doteq \Delta p \omega C_d \quad (7)$$

That is to say, the diaphragm velocity is independent of $Z_0$ and $C_1$. If $\Delta p$ is constant, $v_d$ is proportional to the frequency. Equations 4 and 3 show that, close to the source, $\Delta p$ is approximately the same as the pressure while at a distance from the source $\Delta p$ is proportional to $k$ and rises directly with the frequency. Close to the source, then $$v_d \propto \omega p \quad (8)$$

And at a distance $$v_d \propto \omega^2 p \quad (9)$$

At higher frequencies the total "current" through the tubes is limited by $2Z_0$, but the possible existence of resonance involving $C_1/2$, $L_d$, $C_d$ may allow $v_d$ to rise to a far higher value than the total "current" through the tubes. If $C_1$ is so small it can be neglected, and the frequency is such that the diaphragm impedance is small compared to $2Z_0$, $$|v_d| \doteq \Delta p / 2Z_0 \quad (10)$$

and is independent of both $C_d$ and $C_1$.
Close to the source $$v_d \propto p \quad (11)$$

And at a distance $$v_d \propto \omega p \quad (12)$$

When $C_1$ is small, the diaphragm velocity is limited by $2Z_0$ even at diaphragm resonance. Hence, the diaphragm resonance peak may be controlled by adjusting $C_1$. If $C_1$ is large enough that it is significant and the diaphragm resonance is so high that $L_d$ is not significant.

$$|v_d| \doteq \frac{\Delta p}{Z_0 \left(\frac{C_1}{C_d} + 2\right)} \quad (13)$$

which shows that $v_d$ may depend upon the ratio of $C_1$ to $C_d$, as well as, the value of $Z_0$.

Figure 26:
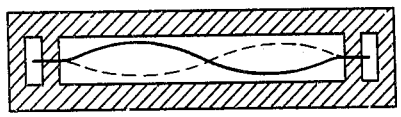

At frequencies above diaphragm resonance it is more difficult to predict the performance of the microphone, since instead of vibrating as a whole the diaphragm tends to vibrate in sections. It is possible, however, to control the mode of vibration of the diaphragm, to some extent, by adjusting the size and shape of $C_1$. The first mode of vibration above the fundamental occurs when the diaphragm vibrates with one nodal diameter, as shown in Fig. 26.

If the cavities on each side of the diaphragm are shallow, the air is pumped back and forth in the cavities in a manner similar to pumping air through slits. The shallow cavities present considerable resistance to the flow of air. It is possible, in practice, to make the cavities sufficiently shallow to suppress, by the coupled acoustic resistance, the one nodal diameter mode of vibration entirely.

As referred to above, in the case of plane waves, the directional characteristics of the normal dipole microphone show the "figure 8" shape like all pressure gradient microphones. The pattern can be changed to a cardioid shape (Fig. 27) or any shape intermediate the two as shown on page 210 in "Elements of Acoustical Engineering," published by D. Van Nostrand Co., Inc. This change can be effected by altering the length of one tube with respect to the other. If one tube is longer than the other by a length equal to the distance between the ends of the dipole, the directional pattern will be a cardioid provided losses in the tubes can be ignored. Strictly speaking, the cardioid pattern is obtained only with sounds originating at a distance from the microphone. For sounds originating close to the microphone there is a difference in pressure amplitude between the two ends of the dipole which prevents complete cancellation in the minimum response direction. If, however, the sensitivity of one side of the microphone is altered (by increasing the losses in one of the tubes), it is possible to make a microphone with zero response for sounds arriving from a definite direction and distance. Consider a dipole microphone in which the absolute ratio of sound pressure at the ends of the dipole must be $$|p_1/p_2|$$

for the pressure on each side of the diaphragm to be equal. Let us suppose, also, that the sound source is located on a line connecting the two ends of the dipole, and that the lengths of the tubes are such that the pressures on both sides of the diaphragm are in phase. Under the assumed conditions, there would be no response to the sound wave. To find the distance from the sound source to the microphone for complete cancellation to take place, let us write:

$$p \propto 1/r \text{ So}$$

From Equation 1

$$p_1/p_2 = r/(r+D)$$
$$r = D/(p_2/p_1 - 1) \quad (14)$$

It is possible, then, to construct a microphone which will not respond to sounds originating at a certain spot. A similar adjustment of the sensitivity of either side of the microphone can be applied when the microphone is adjusted for directional patterns between "figure 8" and cardioid, but not when the pattern is a normal "figure 8."

Other modifications of the invention

While the invention has been disclosed above as a double tube or dipole microphone, it can be adapted to a single tube microphone by omitting the mouthpiece 17 and either one of the tubes 15 or 16 (Fig. 3). It will be understood, of course, that the retained tube, such as 16, will have its free end treated with a suitable terminal resistance which may be silk fabric, such as 40 (Fig. 6), or which may be a tuft of cotton or the like inserted therein and that the acoustic impedance associated with the other side of the diaphragm will be made suitably low preferably by increasing the size of the cavity back of the diaphragm. Such a microphone may be used in a combined telephone set similar to that of Fig. 1 when the noise-cancelling feature is not necessary.

The single tube unit which functions as a pressure microphone may also be combined with a pressure gradient microphone to provide a combination pressure and velocity responsive pick-up device (Fig. 28) for use in an acoustical wattmeter or in an impedance meter. While this pickup device is shown diagrammatically, the pressure gradient microphone portion thereof, with the exception of the mouthpiece, may be identical with the microphone illustrated in Figs. 1 to 16 inclusive and corresponding parts are designated by the same reference characters with the letter "a" added thereto. The free ends of the tubes 15a and 16a are each provided with a suitable terminal acoustic resistance designated 53. The pressure microphone comprises the microphone element 2b, which may be similar to that described, communicates with the tube 16b provided at its free end with a suitable terminal resistance such as an insert of cotton 54 or it may be in the form of a silk fabric covering, such as previously mentioned. The free ends of the tubes 15a, 16a and 16b which serve as probe tubes are arranged close together with the end of probe tube 16b located between the other two.

As long as the distance between points X and Z at the free ends of the dipole tubes is small compared to the wave length of sound being measured, the pressure difference between X and Z is proportional, both in phase and amplitude, to the particle velocity at a third point Y between the first two. If the pressure is also measured at Y, we have enough information to obtain either the specific acoustic impedance which is the complex ratio of pressure divided by the particle velocity, or the acoustic power passing the ends of the probe tubes, which is the real part of the complex product of pressure and particle velocity.

The pressure gradient microphone, then, gives a voltage which is proportional in amplitude to the particle velocity of the sound wave, while the pressure microphone gives a voltage which is proportional in amplitude to the pressure. If the total phase shift from the ends of the dipole tubes to the output terminals of the pressure gradient microphone is the same as the total phase shift from the end of the single tube to the output terminals of the pressure microphone, the phase difference between the two voltages is the same as the phase difference between the particle velocity and the pressure components of the sound wave. When the two voltages, just mentioned, have been thus developed, they can be introduced into appropriate electronic circuits and the complete assembly may be referred to as an acoustical wattmeter or impedance meter to give either the power or the impedance.

The acoustical wattmeter or impedance meter may be somewhat similar to that disclosed by Clapp and Firestone in the Journal of the Acoustical Society of America, issue of October, 1941, pages 125 and 126. In Fig. 29, there is shown a simplified block diagram of such a meter. In this diagram, the output of the velocity microphone 2a is connected to an alternating current amplifier and attenuator unit 56. The output of this unit is coupled to a phase corrector 57 which in turn is coupled to a thermocouple wattmeter 58. The output of the pressure microphone 2b of the pickup shown in Fig. 28 is likewise connected to an alternating current amplifier and attenuator unit 59. The output of this unit is coupled to a phase corrector 60 which in turn is also linked to the thermocouple wattmeter 58. The output of this thermocouple is delivered to an output galvanometer 61 which is calibrated in watts per square centimeter of sound power passing the pickup. It should be pointed out that if the microphone units 2a and 2b are suitably matched, the phase correctors 57 and 60, can be omitted.

Another form of pickup device for use in an acoustical impedance meter or wattmeter, is illustrated in Fig. 30 wherein two pressure microphones, each having the parts 2b, 16b and 54, are mounted to have the free ends of the probe tubes 16b close together. With the pickup device just described, the pressure can be measured by taking the complex sum of the voltages from the two microphones 2b and the pressure gradient (or velocity) can be measured by taking the difference between these voltages.

The pickup device, comprising the microphones 2b, 2b (Fig. 30), can be utilized in the meter of Fig. 29, when the bridge network 65, together with the pair of vacuum tubes 66 and 67 of Fig. 31, are substituted for the portion of the diagram at the left of the broken line in Fig. 29. The vacuum tubes 66 and 67 can be dispensed with, if the input impedance to amplifiers 56 and 59 (Fig. 29) is high.

What we claim is:

1. In a transducer, a microphone unit including a diaphragm cooperating with portions of said unit to define a chamber, an electrical element influenced by said diaphragm, a tube of substantial length for conveying sound pressure to said chamber and communicating at one end with said chamber, the other end of said tube being disposed for picking up sounds to be communicated to said diaphragm, and means only at said other end of said tube for substantially eliminating the effect of standing waves therein.

2. In a transducer, a microphone unit including a diaphragm cooperating with portions of said unit to define a chamber, an electrical element influenced by said diaphragm, a tube of substantial length for conveying sound pressure to said chamber and communicating at one end with said chamber, the other end of said tube being disposed for picking up sounds to be communicated to said diaphragm, means only at said other end of said tube for substantially eliminating the effect of standing waves in said tube, and a puff screen covering the other end of said tube.

3. In a telephone set, a microphone adapted to be supported adjacent the ear of the user, and a tube adapted to extend from the microphone to a point adjacent the mouth of the user whereby sound is conveyed to the microphone, the end of said tube adjacent the mouth of the user being provided with means for substantially eliminating the effect of standing waves therein.

4. In a telephone set, a microphone adapted to be supported adjacent the ear of the user, a tube of a length to extend from the microphone to a point adjacent the mouth of the user whereby sound is conveyed to the microphone, the end portion of the tube adjacent the mouth of the user having means thereat for substantially eliminating the effect of standing waves in said tube, and a puff screen substantially covering the last-mentioned end of said tube.

5. In a transducer, a microphone unit including a diaphragm cooperating with portions of said unit to define a chamber at each side of said diaphragm, electrical means influenced by said diaphragm, means provided with only a pair of tubular passages, one passage communicating at one end thereof with one of said chambers and one end of the other passage communicating with the other chamber, the distance between the remaining ends of said passages being small compared to the wavelength of the desired sounds to be received and disposed for picking up sounds to be communicated to said diaphragm, and means only at said remaining ends for substantially eliminating the effect of standing waves in said passages.

6. In a transducer, a microphone unit including a diaphragm cooperating with portions of said unit to define a chamber at each side of said diaphragm, electrical means influenced by said diaphragm, means provided with only a pair of tubular passages, one passage communicating at one end thereof with one of said chambers and one end of the other passage communicating with the other chamber, the distance between the remaining ends of said passages being small compared to the wavelength of the desired sounds to be received and disposed for picking up sounds to be communicated to said diaphragm, means only at said remaining ends for substantially eliminating the effect of standing waves in said passages and puff screens covering the last-mentioned ends of said passages.

7. In a combined transmitter and receiver unit adapted to be supported adjacent the ear of the user, a case, a microphone element and a receiver element mounted therein, a magnetic shield positioned between said elements, each of said elements having means developing a magnetic field, the magnetic means of one element being positioned at substantially right angles to that of the other, the microphone element comprising a capsule, a diaphragm cooperating with said capsule to define a chamber at each side of said diaphragm, said diaphragm serving to influence the electrical means of said microphone, and means having long slender passages respectively communicating with said chambers and adapted to terminate at spaced points adjacent the mouth of the user.

8. In a combined transmitter and receiver unit adapted to be supported adjacent the ear of the user, a case, a microphone element and a receiver element mounted therein, a magnetic shield positioned between said elements, each of said elements having means developing a magnetic field, the magnetic means of one element being positioned at substantially right angles to that of the other, the microphone element comprising a capsule, a diaphragm cooperating witn said capsule to define a chamber at each side of said diaphragm, said diaphragm serving to influence the electrical means of said microphone, means having long slender passages respectively communicating with said chambers and adapted to terminate at spaced points adjacent the mouth of the user, and means substantially eliminating the effect of standing waves in said passages.

9. In a combined transmitter and receiver unit adapted to be supported adjacent the ear of the user, a case, a microphone element and a receiver element mounted therein, a magnetic shield positioned between said elements, each of said elements having means developing a magnetic field, the magnetic means of one element being positioned at substantially right angles to that of the other, the microphone element comprising a. capsule, a diaphragm cooperating with said capsule to define a chamber at each side of said diaphragm, said diaphragm serving to influence the electrical means of said microphone, means having long slender passages communicating with said chambers and adapted to have their free ends terminate at spaced points adjacent the mouth of the user, means substantially eliminating the effect of standing waves in said passages, and puff screening covering the free ends of said passages.

10. In a combined transmitter and receiver unit adapted to be supported adjacent the ear of the user, a case having a microphone element and a receiver element mounted therein, a magnetic shield positioned between said elements, each of said elements having means developing a magnetic field, the magnetic means of one element being positioned at substantially right angles to that of the other, the microphone element comprising a capsule, a diaphragm cooperating with said capsule to define a chamber, said diaphragm serving to influence the electrical means of said microphone, and a tube having a long slender passage communicating with said chamber and adapted to terminate at a point adjacent the mouth of the user, said tube being made of a material adapting it to be shaped to the face of the user.

11. In a transducer, a microphone unit including a diaphragm cooperating with portions of said unit to define a chamber at each side of said diaphragm, electrical means influenced by said diaphragm, a pair of tubes having two of their ends respectively communicating with said chambers, means for changing the effective length of at least one of said tubes, the other end of said tube being disposed for picking up sounds to be communicated to said diaphragm, and means only at said other ends of said tubes for substantially eliminating the effect of standing waves in said tubes.

12. In a transducer, a microphone unit including a diaphragm cooperating with portions of said unit to define a chamber at each side of said diaphragm, electrical means influenced by said diaphragm, means provided with a pair of tubular passages, one passage communicating at one end thereof with one of said chambers and one end of the other passage communicating with the other chamber, and a mouthpiece comprising an elongated block having a pair of side openings therein respectively communicating with the remaining ends of said passages, said side openings respectively communicating with an opening in each end of said block, said block being supported during use with one end opening therein directed toward the wearer's mouth and the other end opening therein being directed away from wearer's mouth.

13. In a transducer, a microphone unit including a diaphragm cooperating with portions of said unit to define a chamber at each side of said diaphragm, electrical means influenced by said diaphragm, means provided with a pair of tubular passages, one passage communicating at one end thereof with one of said chambers and one end of the other passage communicating with the other chamber, a mouthpiece comprising an elongated block having a pair of side openings therein respectively communicating with the remaining ends of said passages, said side openings respectively communicating with an opening in each end of said block, said block being supported during use with one end opening therein directed toward the wearer's mouth and the other end opening therein being directed away from wearer's mouth, and pieces of porous material, such as silk, providing acoustical impedance at said end openings.

14. In a sound pick-up device, a microphone comprising a hollow capsule divided by a diaphragm into two chambers, electrical means arranged to be influenced by said diaphragm, tubular means having two passages respectively communicating at one end with said chambers, said tubular means having the free end thereof terminating at a position remote from said chambers with the free ends of said passages spaced a small distance apart compared to the wavelength of the desired sound being measured, and a second microphone comprising a diaphragm and electrical means to be influenced thereby, a tube having one end communicating with said last-mentioned diaphragm and having its other or free end terminating between the free ends of said passages, means for substantially eliminating the effect of standing waves in said tube and in said passages, and means for combining the responses of said microphones.

15. In a sound pick-up device, a pair of microphones each provided with a probe-like tube to communicate sound effects to its respective microphone, the exposed ends of said tubes terminating close together, means only at said exposed ends for substantially eliminating the effect of standing waves in said tubes, and means for combining the responses of said microphones.

16. In a transducer, a microphone unit including a diaphragm cooperating with portions of said unit to define a chamber at each side of said diaphragm, electrical means influenced by said diaphragm, means providing a pair of tubular passages, one passage communicating at one end thereof with one of said chambers and the other passage communicating at one end thereof with the other of said chambers, the distance between the other ends of said passages being small compared to the wavelength of the desired sounds to be received, means for varying the length of one of said passages, and means only at said other ends of said tubes for substantially eliminating the effect of standing waves in said passages.

17. In a transducer, a microphone unit including a diaphragm cooperating with portions of said unit to define a chamber at each side of said diaphragm, electrical means influenced by said diaphragm, means providing a pair of tubular passages, one passage communicating at one end thereof with one of said chambers and one end of the other passage communicating with the other chamber, the distance between the other ends of said passages being small compared to the wavelength of the desired sounds to be received, one of said passages being longer than the other of said passages by a length equal to the spacing between said other ends of said passages, and means only at said other ends of said tubes for substantially eliminating the effect of standing waves in said passages.

BENJAMIN OLNEY.
FRANK H. SLAYMAKER.
WILLARD F. MEEKER.

REFERENCES CITED

The following references are of record in the file of this patent:

UNITED STATES PATENTS

| Number | Name | Date |
|---|---|---|
| 763,755 | Holmstrom | June 28, 1904 |
| 835,860 | Lind | Nov. 13, 1906 |
| 898,620 | Wood | Sept. 15, 1908 |
| 1,290,621 | Malthaner | Jan. 7, 1919 |
| 1,707,544 | Thuras | Apr. 2, 1929 |
| 1,915,358 | Giles | June 27, 1933 |
| 2,109,761 | Warnke | Mar. 1, 1938 |
| 2,178,216 | Anderson | Oct. 31, 1939 |
| 2,200,097 | Phelps | May 7, 1940 |
| 2,210,415 | Kellog | Aug. 6, 1940 |
| 2,228,886 | Olson | Jan. 14, 1941 |
| 2,299,620 | Giannini | Oct. 20, 1942 |
| 2,346,395 | Rettinger | Apr. 11, 1944 |
| 2,352,305 | Anderson | June 27, 1944 |

FOREIGN PATENTS

| Number | Country | Date |
|---|---|---|
| 30,075 | Sweden | Jan. 7, 1911 |